United States Patent
Wu

(10) Patent No.: US 12,375,713 B2
(45) Date of Patent: *Jul. 29, 2025

(54) METHOD FOR ENCODING AND/OR DECODING IMAGES ON MACROBLOCK LEVEL USING INTRA-PREDICTION

(71) Applicant: INTERDIGITAL VC HOLDINGS, INC., Wilmington, DE (US)

(72) Inventor: Yu Wen Wu, Beijing (CN)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,927

(22) Filed: Sep. 14, 2023

(65) Prior Publication Data

US 2024/0031602 A1  Jan. 25, 2024

Related U.S. Application Data

(63) Continuation of application No. 17/457,742, filed on Dec. 6, 2021, now Pat. No. 11,792,427, which is a
(Continued)

(51) Int. Cl.
*H04N 19/59* (2014.01)
*H04N 19/593* (2014.01)
(Continued)

(52) U.S. Cl.
CPC ........... *H04N 19/593* (2014.11); *H04N 19/11* (2014.11); *H04N 19/172* (2014.11); *H04N 19/174* (2014.11); *H04N 19/176* (2014.11)

(58) Field of Classification Search
CPC .............................. H04N 7/50; H04N 7/26244
See application file for complete search history.

(56) References Cited

U.S. PATENT DOCUMENTS 7,289,672 B2   10/2007  Sun et al.
7,724,820 B2    5/2010  Youn et al.
(Continued)

FOREIGN PATENT DOCUMENTS

CN   1956546 A   5/2007
EP   2346259 A2  7/2011
(Continued)

OTHER PUBLICATIONS

List of Patents or Patent Applications Treated as Related dated Sep. 14, 2023, 112 pages.
(Continued)

*Primary Examiner* — Chikaodili E Anyikire
(74) *Attorney, Agent, or Firm* — Tutunjian & Bitetto, P.C

(57) ABSTRACT

Conventional intra-prediction uses pixels from left and upper neighbour blocks to predict a macroblock (MB). Thus, the MBs must be sequentially processed, since reconstructed left and upper MBs must be available for prediction. In an improved method for encoding Intra predicted MBs, a MB is encoded in two steps: first, a first portion of the MB is encoded independently, without references outside the MB. Pixels of the first portion can be Intra predicted using DC mode. Then, the first portion is reconstructed. The remaining pixels of the MB, being a second portion, are intra predicted from the reconstructed pixels of the first portion and then reconstructed. The first portion comprises at least one column or one row of pixels of the MB. The encoding is applied to at least two Intra predicted MBs per slice, or per picture if no slices are used.

20 Claims, 3 Drawing Sheets

Related U.S. Application Data continuation of application No. 16/804,417, filed on Feb. 28, 2020, now Pat. No. 11,197,022, which is a continuation of application No. 14/124,708, filed as application No. PCT/CN2011/075385 on Jun. 7, 2011, now Pat. No. 10,728,575.

(51) Int. Cl.
 *H04N 19/11* (2014.01)
 *H04N 19/172* (2014.01)
 *H04N 19/174* (2014.01)
 *H04N 19/176* (2014.01)

(56) References Cited

U.S. PATENT DOCUMENTS

| | | | |
|---|---|---|---|
| 8,223,838 B2* | 7/2012 | Iwata | H04N 19/176 375/240.12 |
| 9,380,298 B1 | 6/2016 | Gu et al. | |
| 10,728,575 B2 | 7/2020 | Wu | |
| 2003/0099294 A1 | 5/2003 | Wang et al. | |
| 2004/0258162 A1* | 12/2004 | Gordon | H04N 19/91 375/240.25 |
| 2005/0123043 A1 | 6/2005 | Wang et al. | |
| 2005/0141618 A1 | 6/2005 | Park et al. | |
| 2005/0157797 A1* | 7/2005 | Gaedke | H04N 19/105 375/240.24 |
| 2006/0126730 A1* | 6/2006 | Arakawa | H04N 19/176 375/240.03 |
| 2006/0209959 A1* | 9/2006 | Sun | H04N 19/61 375/240.16 |
| 2006/0222066 A1 | 10/2006 | Yoo et al. | |
| 2008/0219349 A1 | 9/2008 | Huang et al. | |
| 2008/0225950 A1 | 9/2008 | Zhu | |
| 2008/0232472 A1* | 9/2008 | Kwon | H03M 13/356 375/240.13 |
| 2008/0240253 A1 | 10/2008 | Au et al. | |
| 2008/0240587 A1 | 10/2008 | Au et al. | |
| 2010/0166327 A1 | 7/2010 | Goel | |
| 2010/0246675 A1* | 9/2010 | Gharavi-Alkhansari | H04N 19/105 375/240.13 |
| 2010/0290527 A1* | 11/2010 | Park | H04N 19/176 375/240.13 |
| 2011/0038414 A1 | 2/2011 | Song et al. | |
| 2011/0058608 A1 | 3/2011 | Yang et al. | |
| 2011/0069900 A1 | 3/2011 | Lee et al. | |
| 2011/0249741 A1* | 10/2011 | Zhao | H04N 19/197 375/240.15 |
| 2012/0014438 A1 | 1/2012 | Segall et al. | |
| 2013/0044814 A1 | 2/2013 | Guo et al. | |
| 2013/0051469 A1* | 2/2013 | Park | H04N 19/159 375/240.14 |
| 2014/0205008 A1 | 7/2014 | Wu | |
| 2020/0204827 A1 | 6/2020 | Wu | |

FOREIGN PATENT DOCUMENTS

| | | |
|---|---|---|
| KR | 100974983 B1 | 8/2010 |
| KR | 20110032331 A | 3/2011 |
| WO | 2006109985 A1 | 10/2006 |
| WO | 2010039000 A2 | 4/2010 |

OTHER PUBLICATIONS

Chen et al., "Video coding using extended block sizes", Video Coding Experts Group—AJ23, ITU Telecommunications Study Group, VCEG-AJ23, 36th Meeting, San Diego, USA, Oct. 8-10, 2008. pp. 1-4.

Shiodera et al., "Bidirectional Intra Prediction", Video Coding Experts Group—AE14, ITU-Telecommunications Standardization Sector, 31st Meeting Marrakech, Morocco, Jan. 15-16, 2007, pp. 1-6.

Ye et al., "Improved Intra Coding", Video Coding Experts Group—AG11 , ITU-Telecommunications Standardization Sector, 33rd Shenzhen, China, Oct. 20, 2007, pp. 1-6.

Telecommucications Std Section of ITU-REC-H 264, "Advanced Video Coding for Generic Audiovisual Services", Nov. 2007, pp. 1-564.

Yin et al., "Hierarchy-Based Fast Intra Prediction Algorithm", Journal of Beijing University of Technology, vol. 32, No. 3, Mar. 2006, pp. 1-6. English Abstract.

Fleury et al., "MPEG-4 video verification model: A solution for interactive multimedia applications", Journal of Electronic Imaging, SPIE vol. 7, Jul. 1, 1998, pp. 502-515.

Peng et al., "Improved Line-based Image Coding by Exploiting Long-Distance Correlations", Visual Comunications and Image Processing, Jul. 11, 2010, pp. 774410-1-8.

Tabatabai et al., "Tool Experiment 6: Intra-Prediction Improvement", 2. JTC-VC Meeting Jul. 21-28, 2010, Geneva, Switzerland, Document JCTVC-B306, pp. 1-12.

Peng et al., "TE06.a: report of line-based coding", 94. MPEG Meeting; Oct. 11-15, 2010, Guagzhou, China, Document: JCTVC-C270, pp. 1-5.

Alam T., "Fast DC Mode Prediction Scheme for Intra 4x4 Block in H.264/AVC Video Coding Standard", Int. Journal of Advanced Computer Science and Applications, vol. 3, No. 9, 1 Sep. 2012, pp. 90-94.

Lai et al., "New intra prediction using the correlation between pixels and lines", 2. JTC-VC Meeting Jul. 21 - 28, 2010, Geneva, Switzerland, Document JCTTV-B040, pp. 1-4.

Nikara et al., "Parallel Multiple-Symbol Variable-Length Decoding", Proceedings_ IEEE International Conference on Computer Design: VLSI in Computers and Processors, Freiberg, Germany, Sep. 16-18, 2002, pp. 126-131.

Wiegand, T., Sullivan, G. J., Bjontegaard, G., & Luthra, A. (2003, July). Overview of the H. 264/AVC video coding standard. IEEE Transactions on circuits and systems for video technology, 13(7), 560-576.

Wiegand, WD3: Working Draft 3 of High-Efficiency Video Coding, JCT-VC 5th Meeting, Mar. 2011; JCTVC-E603- :15_published May 20, 2011.

Ye et al., "Improved H.264 Intra Coding Based On Bi-Directional Intra Prediction, Directional Transform, and Adaptive Coefficient Scanning", 2008 15th IEEE International Conference on Image Processing, San Diego, Ca, USA, 2008, pp. 2116-2119, doi: 10.1109/ICIP.2008.4712205.

Balle et al., "Extended Texture Prediction for H.264/AVC Intra Coding", Image Processing, 2007. ICIP 2007. IEEE International Conference on Sep. 16, 2007-Oct. 19, 2007, (vol. 6 ), pp. VI-93-VI-96.

Tan et al.:; Intra Prediction by Template Matching; Image Processing, 2006 IEEE International Conference on Oct. 8-11, 2006, pp. 1693-1696.

International Search Report from International Application No. PCT/CN2011/075385 Mar. 15, 2012, 2 pgs.

\* cited by examiner

METHOD FOR ENCODING AND/OR DECODING IMAGES ON MACROBLOCK LEVEL USING INTRA-PREDICTION

CROSS-REFERENCE TO RELATED APPLICATIONS

This application is a Continuation of co-pending U.S. patent application Ser. No. 17/457,742 filed Dec. 6, 2021, which is a continuation of U.S. patent application Ser. No. 16/804,417 filed on Feb. 28, 2020, now issued U.S. Pat. No. 11,197,022, which is a continuation of U.S. patent application Ser. No. 14/124,708 filed on Dec. 7, 2013, now issued U.S. Pat. No. 10,728,575 which is a U.S. National Stage application of PCT/CN2011/075385 filed on Jun. 7, 2011.

FIELD OF THE INVENTION

This invention relates to the technical field of digital video coding. In particular, it relates to a method for encoding images on macroblock level and a method for decoding images on macroblock level, whereby intra prediction is used.

BACKGROUND

The H.264/AVC video coding standard offers several kinds of Intra prediction to reduce spatial redundancy between spatially adjacent blocks. In Intra prediction, pixels from already coded neighbouring blocks of a current block are used to predict the current block. For coding of the luminance signal, H.264 allows a total of nine Intra prediction modes for 4×4 and 8×8 blocks, and a total of four Intra prediction modes for 16×16 blocks. Similarly, a total of four Intra modes are usable to predict 8×8 chroma blocks for chrominance signals.

In recent years, several new Intra coding methods were proposed. For example in "Intra Prediction by Template Matching" by T. K. Tan, C. S, Boon and Y. Suzuki in Proc. ICIP'06, October 2006, template matching (TM) is used to search for matching blocks within the already coded areas of the current frame. In TM, both the encoder and the decoder perform the same motion search using already coded neighbouring pixels, therefore eliminating the need for coding the motion vectors. In "Extended Texture Prediction for H.264/AVC Intra Coding" by J. Balle and M. Wien in Proc. ICIP'07, October 2007, a combination of TM and Displaced Intra Prediction (DIP) are used. Similar to TM, DIP uses motion search to find matching blocks in the already coded areas of the current frame. Unlike TM, DIP performs motion search using the current block and sends the motion vectors to the decoder. Further, a new Intra coding method named Bidirectional Intra Prediction (BIP) was proposed by VCEG. BIP uses two techniques: combining two existing prediction modes to form bidirectional prediction modes, and allowing alternative coding order of 4×4 and 8×8 blocks within a macroblock (MB).

Conventional intra-prediction uses pixels from left and upper neighbour blocks to predict a MB. The MBs must be sequentially processed, since a reconstructed left and upper MB must be available for prediction. In at least all the above-mentioned Intra coding methods, the reconstructed pixels from the same slice as a current MB but not belonging to the current MB are necessary for Intra prediction of the current MB. Due to this characteristic, all the Intra MBs in a slice must be serially decoded.

SUMMARY OF THE INVENTION

It would be desirable to design an Intra prediction method which is more independent from adjacent reconstructed MBs. The present invention discloses an Intra prediction method that solves at least the above-mentioned problems, and provides further advantages mentioned below.

According to the invention, an Intra predicted MBs is encoded in two steps: first, a first portion of the MB is encoded independently, that is by using Intra prediction without further references outside the MB. This first portion is called independent portion herein, and the pixels of the first portion are called independent pixels. For example, all pixels of the first portion are Intra predicted using DC mode, or one or more first pixels of the first portion are Intra predicted using DC mode and other pixels of the first portion are predicted from the one or more first pixels. Then, the first portion is reconstructed. A second portion of the MB (being the remaining pixels of the MB) is intra predicted from the reconstructed pixels of the first portion, using any intra prediction mode, and then reconstructed. The first portion comprises at least one column or one row of the MB, or half the pixels of one column and half the pixels of one row. The encoding is applied to at least two Intra predicted MBs per slice, or to at least two Intra predicted MBs per picture if no slices are used. In one embodiment, the encoding is applied to all Intra predicted MBs of a slice or a picture.

A corresponding decoding method comprises decoding pixels a first portion of a macroblock without referencing other pixels outside the first portion of the macroblock, and decoding pixels of a second portion of the macroblock using intra prediction, wherein the intra prediction references pixels of the first portion of the macroblock or previously encoded pixels of the second portion of the macroblock.

The disclosed Intra prediction allows encoding and decoding of MBs independent from other MBs, so that high performance parallel Intra coding and/or decoding is easily possible. Furthermore, video coder/decoder processing can be accelerated with the disclosed Intra prediction method. Even within a slice, simultaneously encoding and simultaneously decoding can begin and continue with a plurality of MBs of the same slice in parallel. Thus, intra-prediction of video, and particularly high-resolution video, can be further improved, so that it is more efficient.

An apparatus for encoding is disclosed in claim 13, and an apparatus for decoding is disclosed in claim 15.

According to the invention, a method for encoding and/or decoding an image on macroblock level using intra-prediction comprises for at least two MBs per slice or picture the steps of encoding and/or decoding a first portion (at least one row and one column, or at least half the pixels of one row and half the pixels of one column) using no prediction references, reconstructing the first portion, encoding and/or decoding the remainder of each MB using prediction based on the reconstructed first portion, and (for decoding) reconstructing the remainder.

In more particular, according to the invention, a method for encoding macroblocks of an image using intra prediction comprises steps of dividing a macroblock into two portions, wherein a first portion comprises at least one column or one row, or half the pixels of one column and half the pixels of one row, and a second portion comprises remaining pixels of the macroblock, encoding pixels of the first portion of the macroblock without referencing pixels outside the first portion of the macroblock, and encoding pixels of the second portion of the macroblock using intra prediction, wherein the intra prediction references said pixels of the first portion of the macroblock or previously encoded pixels of the second portion of the macroblock.

Further according to the invention, a method for decoding macroblocks of an image using intra prediction comprises steps of determining an intra-coded macroblock in an encoded picture, decoding pixels of a first portion of the macroblock without referencing other pixels outside the first portion of the macroblock, and decoding pixels of a second portion of the macroblock using intra prediction, wherein the intra prediction references previously decoded pixels of the first portion of the macroblock or of the second portion of the macroblock.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an 8×8 MB and its surrounding pixels from reconstructed MBs for conventional intra-prediction.

DETAILED DESCRIPTION OF THE INVENTION

Figure 1:
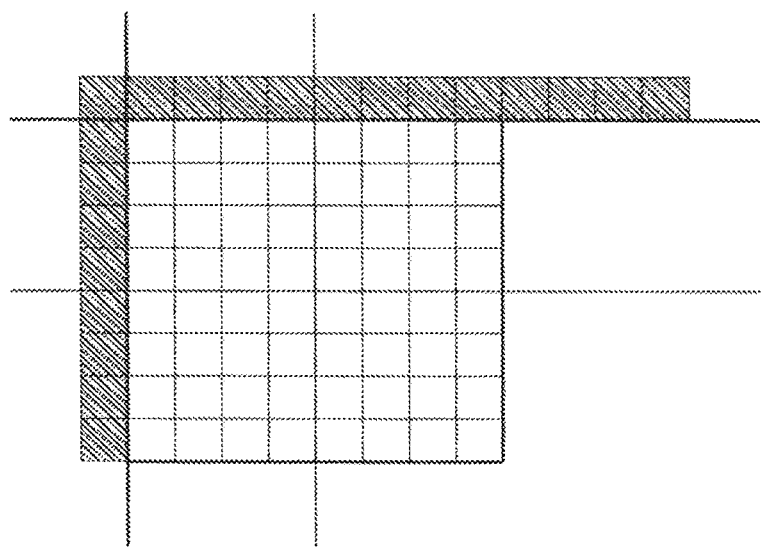

FIG. 1 shows an example of a MB being decoded, which includes 8×8 pixels (white blocks). The shaded pixels are the potential reconstructed pixels from neighbour MBs, which may conventionally be used in reconstructing the current MB. E.g. some or all those shaded pixels will be used when reconstructing the current MB in H.264 Intra prediction. This results in a dependence between a currently decoded MB and its adjacent MBs in left, top, top-left and top-right direction. Thus, the adjacent MBs which include shaded pixels in FIG. 1 must be decoded before decoding the current MB. With this kind of prediction, it is hard to parallelize Intra decoding. In other words, it is a bottleneck of developing parallel video decoders e.g. with multi-core processors, such as Intel dual-core CPU and GPU.

The present invention can eliminate this dependence and provide a new independence Intra prediction, which allows Intra decoding processing to be parallelized. To remove the dependency between MBs during Intra prediction, no pixels from other MBs are involved in Intra prediction. There is a DC mode in H.264 Intra prediction mode which does not need pixels from other MBs. The prediction value of DC mode is $$\text{Pred}=(1<<(\text{BitDepth}_y-1)) \qquad (\text{eq.1})$$

Here, $\text{BitDepth}_y$ is bit depth of luma. However, if every pixel in a current MB is predicted by the DC mode, the coding performance will be not good enough.

Figure 2:
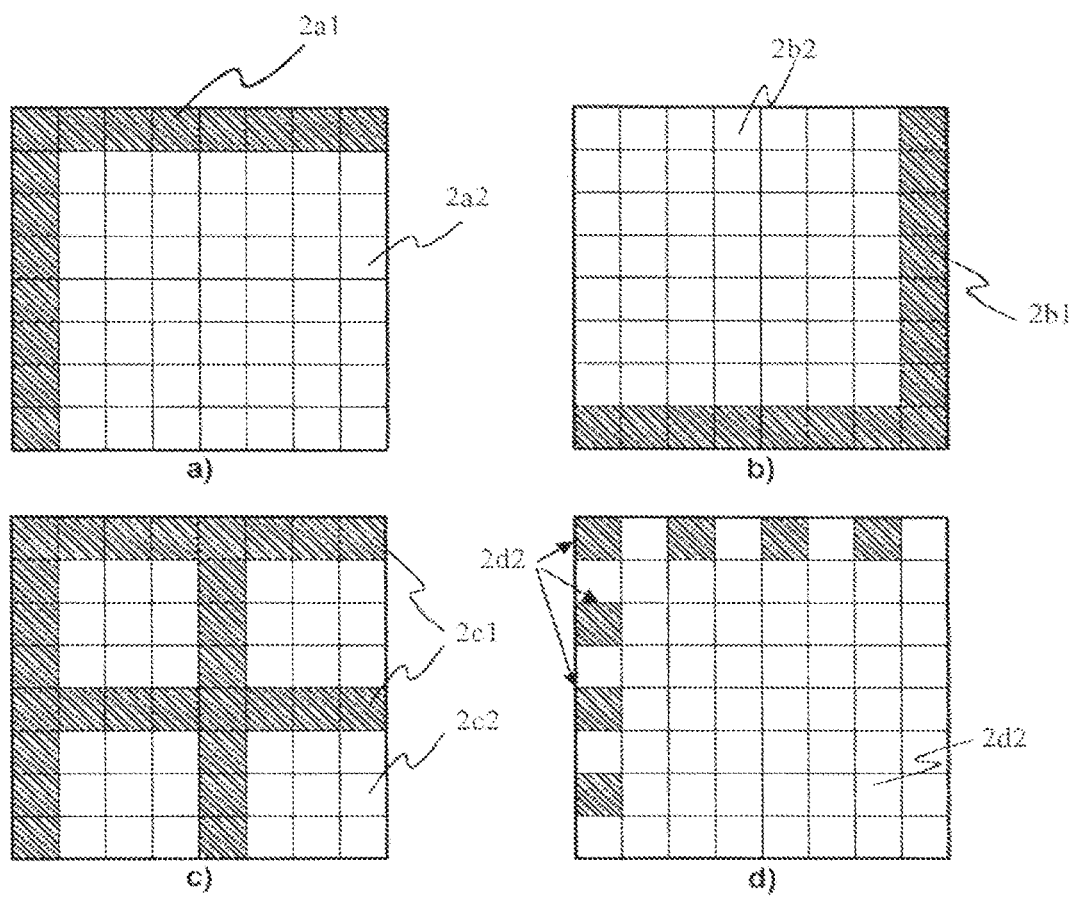
FIG. 2 various arrangements of independent and dependent pixels in an 8×8 MB.

As a solution, the pixels in a current MB are divided into two classes, as shown in FIG. 2. The shaded pixels $2a1$, $2b1,2c1,2d1$ are the independent pixels, and are used to predict the other pixels $2a2,2b2,2c2,2d2$. Various partitions are possible: FIG. 2 shows four exemplary kinds of partition. E.g., in FIG. 2c), the independent pixels $2c1$ are the first portion to be encoded, and the remaining pixels $2c2$ are the second portion. However, to be effective, the first partition must be at least one row or one column, or both half the pixels of one column and half the pixels of one row (such as in FIG. 2d), where the first portion $2d1$ comprises every other pixel of both one row and one column), regardless which row or which column. Higher efficiency can be achieved when the first partition covers one full row and one full column, as shown in FIG. 2a)-c), regardless which row or which column. Different partitions will bring on different prediction modes for the pixels of the second portion. We call the shaded pixel independent pixels and the remaining (white) pixels dependent pixels. So, the Intra prediction processing is divided into two parts. First, the independent pixels are predicted by an independent mode, such as DC mode in eq.(1). Another solution would be to encode the actual value. Second, the other pixels are predicted by any conventional or new intra coding mode, such as modes used in H.264 or in BIP.

Figure 3:
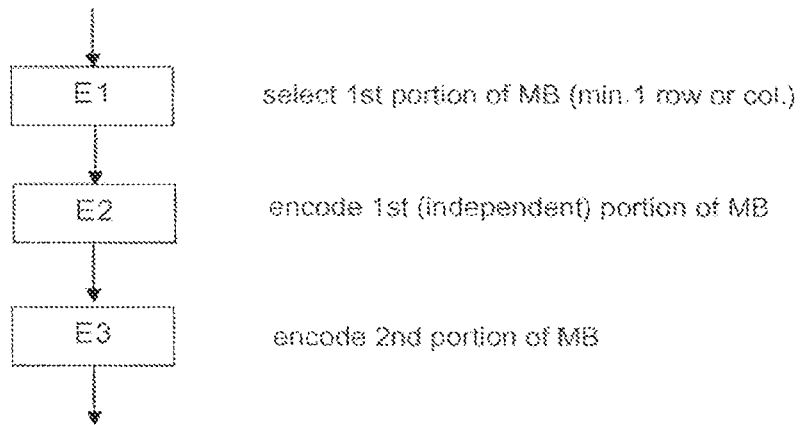
FIG. 3 a flow-chart of the encoding method.

FIG. 3 shows a flow-chart of the method for encoding macroblocks of an image using intra prediction. The method comprises steps of dividing E1 a MB into two portions, wherein a first portion comprises at least one column or one row, and a second portion comprises remaining pixels of the MB, encoding E2 pixels of the first portion of the MB without referencing pixels outside the first portion of the MB, and encoding E3 pixels of the second portion of the MB using intra prediction, wherein the intra prediction references said pixels of the first portion of the MB or previously encoded pixels of the second portion of the MB.

Various advantageous embodiments are the following:

In one embodiment, the step of encoding pixels of the first portion of the MB without referencing pixels outside the first portion of the MB comprises steps of encoding one or more first pixels of the first portion of the MB without reference, and encoding remaining second pixels of the first portion of the MB with referencing the first pixels.

In one embodiment, pixels that are referenced are reconstructed pixels, and the method further comprises a step of reconstructing the first portion of the MB before said step of encoding pixels of the second portion of the MB. If, in this embodiment, the step of encoding pixels of the first portion of the MB comprises encoding one or more first pixels of the first portion of the MB without reference and encoding remaining second pixels of the first portion of the MB with referencing the first pixels, then the encoded one or more first pixels of the first portion of the MB are reconstructed before encoding the remaining second pixels of the first portion of the MB.

In one embodiment, DC mode according to eq.(1) is used for the encoding of pixels without referencing other pixels. In one embodiment, the first portion comprises at least both one column and one row.

In one embodiment, the method further comprises a step of encoding an indication that indicates a MB encoded according to the current encoding method, i.e. in two portions.

In one embodiment, at least two intra-coded MBs per image are encoded simultaneously. In one embodiment, the image comprises at least one slice, and at least two intra-coded MBs in the at least one slice are encoded simultaneously. This may be done in one or more or all slices of the image. In one embodiment, the method further comprises a step of encoding an indication that indicates the coding mode for a MB.

Figure 4:
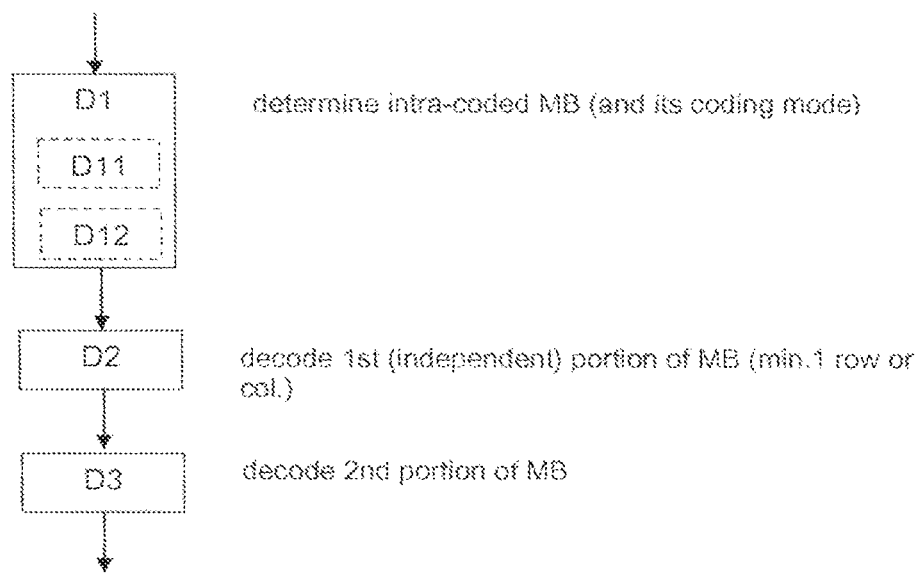
FIG. 4 a flow-chart of the decoding method.

FIG. 4 shows a flow-chart of the decoding method for decoding MBs of an image using intra prediction. The decoding method comprises steps of determining D1 an intra-coded MB in an encoded picture, decoding D2 pixels of a first portion of the MB without referencing other pixels outside the first portion of the MB, and decoding D3 pixels of a second portion of the MB using intra prediction, wherein the intra prediction references previously decoded pixels of the first portion of the MB or of the second portion of the MB.

Various advantageous embodiments are the following:

In one embodiment, the step of determining a MB comprises steps of decoding D11 an indication that refers to a MB, evaluating D12 the indication, and upon evaluating the indication and determining the coding mode, performing said steps of decoding pixels of the first portion of the MB and decoding pixels of the second portion of the MB.

In one embodiment, the first portion comprises one full column and one full row of pixels. In one embodiment, the method further comprises a step of encoding an indication that indicates a MB encoded according to the current encoding method. In one embodiment, the image comprises at least one slice, and at least two intra-coded MBs in the at least one slice are decoded simultaneously. This may be done in one or more or all slices of the image.

Any Intra prediction mode that does not depend on other pixels can be utilized to predict the independent pixel. The DC mode mentioned above is an example. The prediction mode used for dependent pixels may depend on the pixel partition in a MB. Different partitions may result in different prediction modes of the dependent pixels. For example for the partition shown in FIG. 2a), after prediction and reconstruction of the independent pixels, we get the reconstructed version of the independent pixels. With those pixels, we can reuse most Intra prediction modes in H.264 and DIP (with simple modifications). While the MB size in H.264 is 16×16 for luma, recent research shows larger MB size benefits to coding efficiency, especially for super HD resolution. The disclosed new Intra prediction can be used for this purpose, since it is easily applicable for any MB size.

Figure 5:
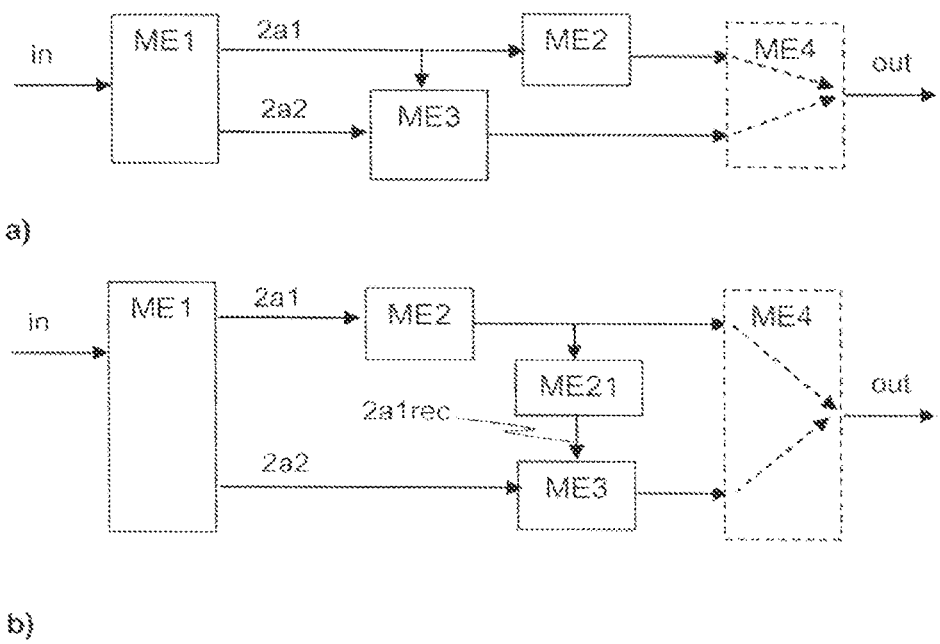
FIG. 5 the structure of an encoder.

In one embodiment, as shown in FIG. 5a, an apparatus for encoding MBs of an image using intra prediction comprises dividing means ME1 for dividing a MB into two portions, wherein a first portion comprises at least one column or one row, and a second portion comprises remaining pixels of the MB, first encoding means ME2 for encoding pixels of the first portion 2a1 of the MB without referencing pixels outside the first portion of the MB, and second encoding means ME3 for encoding pixels of the second portion 2a2 of the MB using intra prediction, wherein the intra prediction references said pixels of the first portion 2a1 of the MB or previously encoded pixels of the second portion 2a2 of the MB. The encoded pixels of the first and the second portion of the MB can be simply combined to an encoded MB, e.g. in a combiner means ME4. The combiner means ME4 may comprise a buffer (not shown in FIG. 5) for adjusting the delay that is caused by the second encoding means ME3, so that the encoded pixels of the first and the second portion of the MB are simultaneously available at the output of the apparatus for encoding (or encoder).

In one embodiment of the apparatus for encoding, pixels that are referenced are reconstructed pixels 2a1rec, and the apparatus further comprises reconstruction means ME21 for reconstructing the pixels of the encoded first portion 2a1 of the MB before these reconstructed pixels are referenced in the second encoding means ME3. This embodiment is shown in FIG. 5b.

Figure 6:
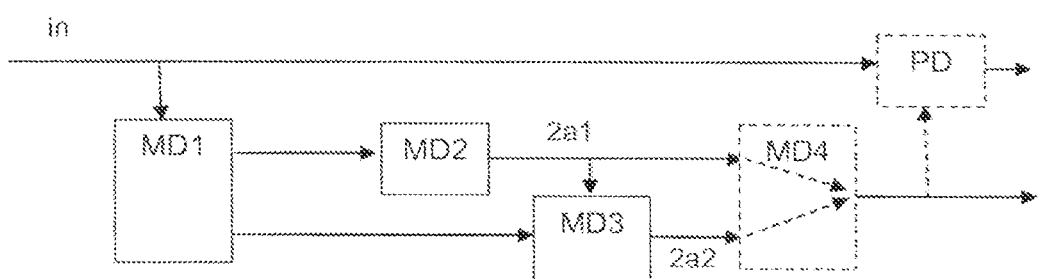
FIG. 6 the structure of a decoder.

In one embodiment, as shown in FIG. 6, an apparatus for decoding MBs of an image using intra prediction comprises determining means MD1 for determining an intra-coded macroblock in an encoded picture, first decoding means MD2 for decoding pixels of a first portion of the MB without referencing other pixels outside the first portion of the MB, and second decoding means MD3 for decoding pixels of a second portion of the MB using intra prediction, wherein the intra prediction references previously decoded pixels of the first portion of the MB or of the second portion of the MB. I.e., the intra prediction refers to previously decoded pixels of the first portion of the MB, or to previously decoded pixels of the second portion of the MB. The decoded pixels of the first and the second portion of the MB can be simply combined to a decoded MB, e.g. in a combiner means MD4. The combiner means MD4 may comprise a buffer (not shown in FIG. 6) for adjusting the delay that is caused by the second decoding means MD3, so that the decoded pixels of the first and the second portion of the MB are simultaneously available at the output of the apparatus for decoding (or decoder).

The intra coded pixels are detected from an input stream in. It is possible that one or more remaining MBs of the encoded image in are intra-coded using a conventional mode, or that at least some remaining MBs are inter-coded and will be decoded in a predictive decoder PD, which may use the reconstructed intra-predicted MBs for prediction.

A particular advantage of the invention is that encoding or decoding of a slice can be performed in parallel simultaneously for each independent MB (i.e. MB that is intra-coded according to the invention); further, each of these independent MBs can be followed by one or more dependent MBs (i.e. intra-coded MBs that use conventional intra prediction and use the MBs as reference). Thus, each slice can effectively be sub-divided into an arbitrary number of MB groups, each having one independent MB as a coding/decoding start point. For example, if a slice has K independent MBs (e.g. K=10), it can be encoded/decoded in up to K parallel simultaneous encoding/decoding processes. Thus, encoding and/or decoding can be adaptively accelerated.

It will be understood that the present invention has been described purely by way of example, and modifications of detail can be made without departing from the scope of the invention. While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

Each feature disclosed in the description and (where appropriate) the claims and drawings may be provided independently or in any appropriate combination.

Features may, where appropriate be implemented in hardware, software, or a combination of the two. Reference numerals appearing in the claims are by way of illustration only and shall have no limiting effect on the scope of the claims.

What is claimed is:

1. A method for decoding a block of an image using intra prediction, said method comprising:

decoding an indication that a block is encoded according to an intra coding mode, the intra coding mode excluding a DC mode;

determining two portions in the block, wherein a first portion comprises pixels of the block that are independent of an availability of adjacent neighboring pixels outside the block, and a second portion comprises remaining pixels of the block;

decoding the first portion using intra-predicted pixels of the first portion; and decoding the second portion using one or more intra-predicted pixels of the second portion, wherein decoded pixels of the first portion and decoded pixels of the second portion are part of a decoded block.

2. The method of claim 1, wherein the first portion comprises at least half the pixels of one column and half the pixels of one row.

3. The method of claim 1, wherein a size of a block encoded according to said intra coding mode is larger than 16×16.

4. The method of claim 1, wherein the image comprises at least one slice, and wherein at least two intra-coded blocks per slice are decoded simultaneously.

5. The method of claim 1 wherein said intra-predicted pixels of the first portion are based on a power of two whose exponent is equal to a bit depth of pixels of the image minus one.

6. A method for encoding a block of an image using intra prediction, said method comprising:

dividing the block into two portions, wherein a first portion comprises pixels of the block that are independent of an availability of adjacent neighboring pixels outside the block, and a second portion comprises remaining pixels of the block;

encoding the first portion using intra-predicted pixels of the first portion;

encoding the second portion using one or more intra-predicted pixels of the second portion, wherein encoded pixels of the first portion and encoded pixels of the second portion are part of an encoded block, said encoded block being encoded by said intra coding mode; and encoding an indication that said block is encoded according to said intra coding mode.

7. The method of claim 6, wherein the first portion comprises at least half the pixels of one column and half the pixels of one row.

8. The method of claim 6, wherein a size of a block encoded according to said intra coding mode is larger than 16×16.

9. The method of claim 6, wherein the image comprises at least one slice, and wherein at least two intra-coded blocks per slice are encoded simultaneously.

10. The method of claim 6, wherein said intra-predicted pixels of the first portion are based on a power of two whose exponent is equal to a bit depth of pixels of the image minus one.

11. An apparatus for decoding a block of an image using intra prediction, said apparatus comprising one or more processors configured to decode an indication that a block is encoded according to an intra coding mode, the intra coding mode excluding a DC mode;

determine two portions in the block, wherein a first portion comprises pixels of the block that are independent of an availability of adjacent neighboring pixels outside the block, and a second portion comprises remaining pixels of the block;

decode the first portion using intra-predicted pixels of the first portion; and decode the second portion using one or more intra-predicted pixels of the second portion, wherein decoded pixels of the first portion and decoded pixels of the second portion are part of a decoded block.

12. The apparatus of claim 11, wherein the first portion comprises at least half the pixels of one column and half the pixels of one row.

13. The apparatus of claim 11, wherein a size of a block encoded according to said intra coding mode is larger than 16×16.

14. The apparatus of claim 11, wherein the image comprises at least one slice, and wherein at least two intra-coded blocks per slice are decoded simultaneously.

15. The apparatus of claim 11, wherein intra-predicted pixels of the first portion are based on a power of two whose exponent is equal to a bit depth of pixels of the image minus one.

16. An apparatus for encoding a block of an image using intra prediction, said apparatus comprising one or more processors configured to:

dividing the block into two portions, wherein a first portion comprises pixels of the block that are independent of an availability of adjacent neighboring pixels outside the block, and a second portion comprises remaining pixels of the block;

encoding the first portion using intra-predicted pixels of the first portion;

encoding the second portion using one or more intra-predicted pixels of the second portion, wherein encoded pixels of the first portion and encoded pixels of the second portion are part of an encoded block, said encoded block being encoded by said intra coding mode; and encoding an indication that said block is encoded according to said intra coding mode.

17. The apparatus of claim 16, wherein the first portion comprises at least half the pixels of one column and half the pixels of one row.

18. The apparatus of claim 16, wherein a size of a block encoded according to said intra coding mode is larger than 16×16.

19. The apparatus of claim 16, wherein the image comprises at least one slice, and wherein at least two intra-coded blocks per slice are encoded simultaneously.

20. The apparatus of claim 16, wherein intra-predicted pixels of the first portion are based on a power of two whose exponent is equal to a bit depth of pixels of the image minus one.

\* \* \* \* \*